United States Patent
Romstoeck et al.

(10) Patent No.: US 10,145,717 B2
(45) Date of Patent: Dec. 4, 2018

(54) METHOD FOR DETERMINING A FILLING LEVEL OF A FLUID TANK IN A MOTOR VEHICLE

(71) Applicant: Robert Bosch GmbH, Stuttgart (DE)

(72) Inventors: Christian Romstoeck, Stuttgart (DE); Andreas Feldges, Marbach (DE)

(73) Assignee: ROBERT BOSCH GMBH, Stuttgart (DE)

(*) Notice: Subject to any disclaimer, the term of this patent is extended or adjusted under 35 U.S.C. 154(b) by 321 days.

(21) Appl. No.: 14/953,661

(22) Filed: Nov. 30, 2015

(65) Prior Publication Data
US 2016/0169728 A1    Jun. 16, 2016

(30) Foreign Application Priority Data
Dec. 16, 2014 (DE) .......... 10 2014 226 137

(51) Int. Cl.
| | |
|---|---|
| G01F 23/00 | (2006.01) |
| G01C 9/00 | (2006.01) |
| G01C 21/26 | (2006.01) |
| G01F 25/00 | (2006.01) |

(52) U.S. Cl.
CPC .......... *G01F 23/0061* (2013.01); *G01C 9/00* (2013.01); *G01C 21/26* (2013.01); *G01F 25/0061* (2013.01)

(58) Field of Classification Search
USPC ....................................................... 702/55
See application file for complete search history.

(56) References Cited

U.S. PATENT DOCUMENTS

| | | | | |
|---|---|---|---|---|
| 4,611,287 A | * | 9/1986 | Kobayashi | G01F 23/20 361/284 |
| 4,890,491 A | * | 1/1990 | Vetter | G01F 23/0076 702/100 |
| 4,935,727 A | * | 6/1990 | Re Fiorentin | G01F 23/0061 340/450 |
| 6,253,607 B1 | * | 7/2001 | Dau | G01D 3/032 73/290 R |
| 6,615,656 B1 | * | 9/2003 | Breed | B60J 10/00 177/136 |
| 6,625,526 B2 | * | 9/2003 | Gras | B60R 16/0232 340/450 |
| 2004/0079150 A1 | * | 4/2004 | Breed | B60J 10/00 73/291 |
| 2010/0145638 A1 | * | 6/2010 | Begin | G01F 23/0076 702/55 |
| 2016/0047684 A1 | * | 2/2016 | Gorenflo | G01F 25/0061 73/290 V |
| 2016/0238426 A1 | * | 8/2016 | Tetil | G01F 23/0038 |

* cited by examiner

*Primary Examiner* — Paul D Lee
(74) *Attorney, Agent, or Firm* — Norton Rose Fulbright US LLP; Gerard Messina

(57) ABSTRACT

A method for determining a filling level of a fluid tank in a motor vehicle, enables both a detection of an ascent or a descent of the motor vehicle with the aid of multiple pieces of position data ascertained in succession via a position determination system, and a plausibility check of the measuring value of the filling level sensor, in that a grade of an associated route section is ascertained for the ascertained position data, a selection of at least two route sections having different grades is carried out, and a measuring value of the filling level sensor to be expected is ascertained for each of them, and a comparison of the measuring values to be expected with the measured measuring values is carried out.

16 Claims, 2 Drawing Sheets

METHOD FOR DETERMINING A FILLING LEVEL OF A FLUID TANK IN A MOTOR VEHICLE

RELATED APPLICATION INFORMATION

The present application claims priority to and the benefit of German patent application no. 10 2014 226 137.6, which was filed in Germany on Dec. 16, 2014, the disclosure of which is incorporated herein by reference.

FIELD OF THE INVENTION

The present invention relates to a method for determining a filling level of a fluid tank in a motor vehicle, in which a first calculation of a fluid volume of the fluid tank is carried out with the aid of a first method using data of a filling level sensor situated in the fluid tank and information about the inclination of the motor vehicle in the longitudinal direction of the vehicle and the transverse direction of the vehicle.

BACKGROUND INFORMATION

In order to comply with the increasingly stringent emissions legislation, it is necessary to carry out an exhaust gas aftertreatment for reducing pollutants such as nitrogen oxides (NOx).

Such nitrogen oxides may be reduced, for example, with the aid of a urea-water solution, which is also referred to hereinafter as UWS, and a catalytic converter situated in the exhaust gas system of a vehicle operated using a diesel engine. In this method, the urea is converted into ammonia via thermolysis and hydrolysis. A so-called SCR (selective catalytic reduction) catalytic converter subsequently reduces the nitrogen oxides into water and nitrogen and thus reduces the pollutant component. This method is referred to as the SCR method.

For this purpose, it is necessary to equip these vehicles with an additional tank in which the urea-water solution may be stored. From this tank, the required quantity of the urea-water solution is conveyed to a device including a metering valve with the aid of a pump and corresponding supply lines and fed into the exhaust gas system, for example, by spraying. Such a metering device for reducing pollutants in exhaust gases is believed to be understood, for example, from DE 10 2008 008 564 A1.

Here, it is necessary to inform the driver about an instantaneous filling level in the tank of the urea-water solution via an indication device such as a display. Furthermore, it is necessary to prompt the driver to replenish the urea-water solution in a timely manner through the use of a suitable arrangement.

In addition, for legislative reasons, a warning scenario is initiated for the driver if the driver does not fulfill this replenishment request. In the extreme case, even restarting the engine is prevented. Therefore, there is the need to ascertain the quantity of the urea-water solution in the tank accurately and also to correctly detect a replenishment operation.

To ascertain a filling level in a tank of the urea-water solution, filling level sensors are used which are situated in the tank. There are variants in which the filling level sensor is situated on the upper side or on the lower side of the tank. In addition, there are continuously and discretely measuring sensors. The ascertainment of the fluid level in the tank is common to all variants.

In order to ascertain the actual quantity or the volume of the urea-water solution in the tank, there are essentially two presently used methods according to the related art.

According to the first method, a calculation of the volume of the fluid in the tank of the vehicle while standing is carried out with the aid of a filling level sensor, whereby a correction of the measurement may take place, for example, including position information generated by an ESP (electronic stability program) sensor system. In the case that the vehicle is inclined at the moment of the measurement of the filling level via the filling level sensor, this may be detected with the aid of the data provided by the ESP sensor system. In this case, the incorrectly ascertained filling level value is corrected with the aid of a correction-calculation algorithm, and the error during the filling level measurement is thus minimized.

Since, in many applications, the ESP sensor system either does not have sufficient accuracy, or it is not possible to perform a plausibility check in a manner sufficient to satisfy the exhaust gas legislation, the second method for ascertaining volume is usually the practice which is presently used, which is also referred to as the multisensor principle.

In this case, the sloshing behavior and the momentary inclination are modeled via the sensor signal with the aid of a filter, in order to prevent erroneous indications in these situations. Inclinations of the vehicle lasting a longer time constitute a particular difficulty for this method, as occur, for example, during ascents. For example, during a long ascent, a significantly higher or lower tank filling level may be modeled than which is actually present. The reason for this is the surface of the urea-water solution in the tank, which is always level, regardless of the position of the vehicle. In addition, during the ascent in the same example, a replenishment may thus be detected erroneously.

In this description, an ascent may be understood to mean a motion of the motor vehicle on an uphill grade for a longer period of time. The period of time is selected to be long enough that driving over smaller rises or hills which takes only a few seconds does not result in the detection of an ascent. Equivalently to the ascent, a descent may be understood to mean a motion of a motor vehicle on a downhill grade over a longer period of time.

To prevent such errors during the volume ascertainment, a piece of information about a longer ascent may, for example, may be used via a determination of the instantaneous air pressure. However, this model has great tolerances. During such an ascent, a correction may be made in the volume calculation with the aid of this air pressure information.

In the second method from the related art, to improve the accuracy of the calculation of the tank content of the vehicle, the tank content during travel is calculated via a variable, the instantaneous consumption, which is available in the vehicle. This piece of information is usually available in a motor vehicle both via the fuel used and via an agent for exhaust gas aftertreatment fed into the exhaust gas system.

The disadvantage of this calculation method is that the consumption calculation over a longer period of time has an error which is too large. To reduce this error, it is furthermore known to combine this calculation method according to the instantaneous consumption with a method for ascertaining the tank content with the aid of a filling level sensor.

In this case, the signal of the filling level sensor, which may be falsified by tilting and inclination influences, is corrected with the aid of a suitable correction algorithm with the aid of vehicle position information. An electronic stabilization system (ESP) may, for example, provide such position information.

Since, in the method of the tank volume calculation using instantaneous consumption information, the error in the consumption ascertainment increases with time due to the summation of small variables, a range is established around the result of this summation, which is referred to as a window below, within which the value of the actual tank volume is assumed.

If the signal of the filling level sensor is within this established range during a comparison, i.e., if the results of the calculations match according to the first method and according to the second method, this value is assumed to be true and the error is set to zero. Subsequently, the calculation of the instantaneous consumption is continued as of this value.

The resulting error growing with time is kept as low as possible during the instantaneous consumption calculation in combination with the corrected filling level sensor signal. In addition to an improvement in the accuracy of the tank gauge, which is in the range of plus or minus one liter, the influence of the dynamics of the tank content on the tank level sensor and thus on the tank gauge is eliminated via a calculation of the tank content with the aid of the instantaneous consumption values, but the plausibility is not essentially improved.

SUMMARY OF THE INVENTION

In the method according to the present invention, both a detection of an ascent or a descent of the motor vehicle with the aid of multiple pieces of position data ascertained in succession via a position determination system, as well as a plausibility check of the measuring value of the filling level sensor, are carried out. For this purpose, a grade of an associated route section is ascertained in each case for the ascertained position data, a selection of at least two route sections having different grades is carried out, and a measuring value of the filling level sensor to be expected is ascertained for each of them. The plausibility check is now carried out via a comparison of the measuring values to be expected with the measured measuring values. As a result of the improved detection of an ascent or a descent of the motor vehicle, the volume ascertainment according to both calculation methods is configured more reliably.

To reliably detect an ascent or a descent, multiple pieces of position data which contain at least geographical coordinates for the accurate determination of the position on the earth's surface are ascertained and compared to each other during the motion of the vehicle. To ascertain such position data, for example, the GPS (Global Positioning System) position determination system or the GALILEO European satellite navigation system may be used.

If the vehicle, for example, is ascending, the value for the elevation associated with each position increases continuously. During a descent, the value for the elevation would correspondingly decrease. It thus possible to reliably infer an ascent of the motor vehicle in particular via a detection, for example, of an increasing elevation value over a predefined duration.

In this case, the magnitude of the predefined duration may be selected such that a brief journey over a hill or uneven terrain does not result in the detection of an ascent or a descent. On the other hand, the selected magnitude of the duration should not be too large in order to detect an ascent or a descent in a reasonable amount of time, i.e., in a timely manner, before, for example, the error of the first calculation method becomes too large.

It is also advantageous to carry out a second calculation of the fluid volume of the fluid tank with the aid of a second method using data about an instantaneous consumption of the fluid of the fluid tank. If a match is determined during a comparison of the calculated fluid volume of both methods, the fluid volume calculated according to the first method, or otherwise the fluid volume calculated according to the second method, is output as the filling level of the fluid tank. In such a way, the accuracy of the volume determination may be improved in particular in the case of an inclination of the vehicle.

It is particularly advantageous to carry out a detection of an ascent or a descent of the motor vehicle via a comparison of multiple pieces of position data ascertained in succession. If, for example, a continuous increase of the value of the elevation is detected during the examination of multiple pieces of position data ascertained in succession, the vehicle is traveling along a grade. The use of multiple or many pieces of position data improves the accuracy of the detection.

A piece of information about a detected ascent or a descent is advantageously output to a central control unit, for example, an engine controller. Thus, in addition to the first and/or the second method, other methods or systems may use this piece of information. For example, this piece of information may be used in the determination of a filling level for deactivating the calculation according to the first method, since the value of the filling level sensor may be erroneous in the case of an inclination of the vehicle.

It is also advantageous to enable only those measuring values for processing with the aid of the first method which match the expected measuring values or lie within an established tolerance range. It is thus prevented that incorrect measuring values result in an erroneous volume determination.

The comparison of the elevation information associated with the position data may be performed over a predefined time interval to ensure a reliable detection.

In addition, the ascent angle may be calculated on the route from the difference in the elevation values and the associated X and Y coordinates. The reliable detection of an ascent or a descent is used for improving the accuracy in the volume calculation according to the first and/or the second calculation method.

It is provided to carry out a plausibility check of the measuring values of the filling level sensor. For this purpose, a road traveled on by the motor vehicle may be divided into multiple small route sections, for which a grade may be determined using the ascertained position data. Such a route section may be formed, for example, between two ascertained position data. The grade of the route section may be ascertained via the difference in elevation between the position data and the known distance between them. If the grade of the route section is known, it is possible to infer the inclination of the motor vehicle which is traveling on this route section. As already known from the related art, it is possible to infer the change to be expected in the measuring signal of a filling level sensor from the inclination, if information about the configuration of the fluid tank and the installation point of the filling level sensor are provided.

Since this is the case, it is possible according to the present invention to infer the value of the measuring signal to be expected. In the simplest case, this expected measuring signal may be compared with the measuring signal measured via the filling level sensor, and the plausibility check may be carried out in such a way.

Another possibility for the plausibility check is to select two route sections having different grades. The measuring value to be expected is ascertained for each of them. Subsequently, a first difference is formed from these measuring values to be expected. When traveling on the two selected route sections, associated measuring values are measured with the aid of the filling level sensor. A second difference is formed from these measured measuring values. According to the method, a comparison of the two differences is carried out. If the differences are equal or deviate from each other only within a predefined tolerance range, the measuring values are plausible. If the deviation of the differences lies outside the tolerance range, the measuring value is not plausible and is not allowed for further processing, for example, with the aid of the first method.

Furthermore, for detecting an ascent or a descent of the motor vehicle, in addition to the position data, it is advantageous to use geographical map data about the route which is presently being traveled on. All geographical maps which provide information about elevation contours are suitable for this.

A navigation system situated in the motor vehicle may provide such map material. Alternatively, publicly available geographical maps may be used.

As the result of a detected ascent or a descent, it is particularly advantageous to filter the signal of the filling level sensor situated in the tank resulting during the measurement of the filling level. For example, the measuring signal may be detected only at points in time at which the inclination angle of the motor vehicle may also be determined, in order to make a corresponding correction calculation possible.

If an ascent or a descent is detected, it is also advantageous to temporarily switch off the calculation of a fluid volume of the fluid tank with the aid of a first method, from data of a filling level sensor situated in the fluid tank and information about the inclination of the motor vehicle, since the calculation result of this method is too highly inaccurate. The filling level of the fluid tank is determined as of the point in time of the detected ascent or a descent only according to the second method, from data about the instantaneous consumption. If the vehicle continues to be in an inclined position, this switchover makes the determination of the volume possible with sufficient accuracy up to the end of the ascent or the descent. If this end is reached, both calculation methods for calculating the volume are again used.

Furthermore, if the ascent or the descent of the motor vehicle is detected, it is advantageous to ascertain a factor which is a function of the grade. This factor is used for correcting the measuring signal of the filling level sensor, since it is proportional to the instantaneous inclination of the vehicle; therefore, the error to be expected in the measuring signal of the filling level sensor due to the inclination of the vehicle may be derived.

For this purpose, the method for determining a filling level of a fluid tank of a motor vehicle may, for example, include a processor for processing the program code as a data processing device. To store the program code, the device is equipped with a nonvolatile memory such as a ROM (read-only memory), EPROM (electrically programmable read-only memory), EEPROM (electrically erasable PROM), or flash EEPROM. This storage arrangement is connected to the processor for transferring data such as a program code and, for example, is situated in an engine controller.

It is advantageous to configure an electronic control unit such as a motor controller in such a way that it is able to implement the steps of the method.

In addition, it is advantageous to store the computer program on a machine-readable storage medium. This greatly facilitates the retrofitting of existing control units.

Exemplary embodiments of the present invention are explained in greater detail in the following description.

DETAILED DESCRIPTION

Figure 1:
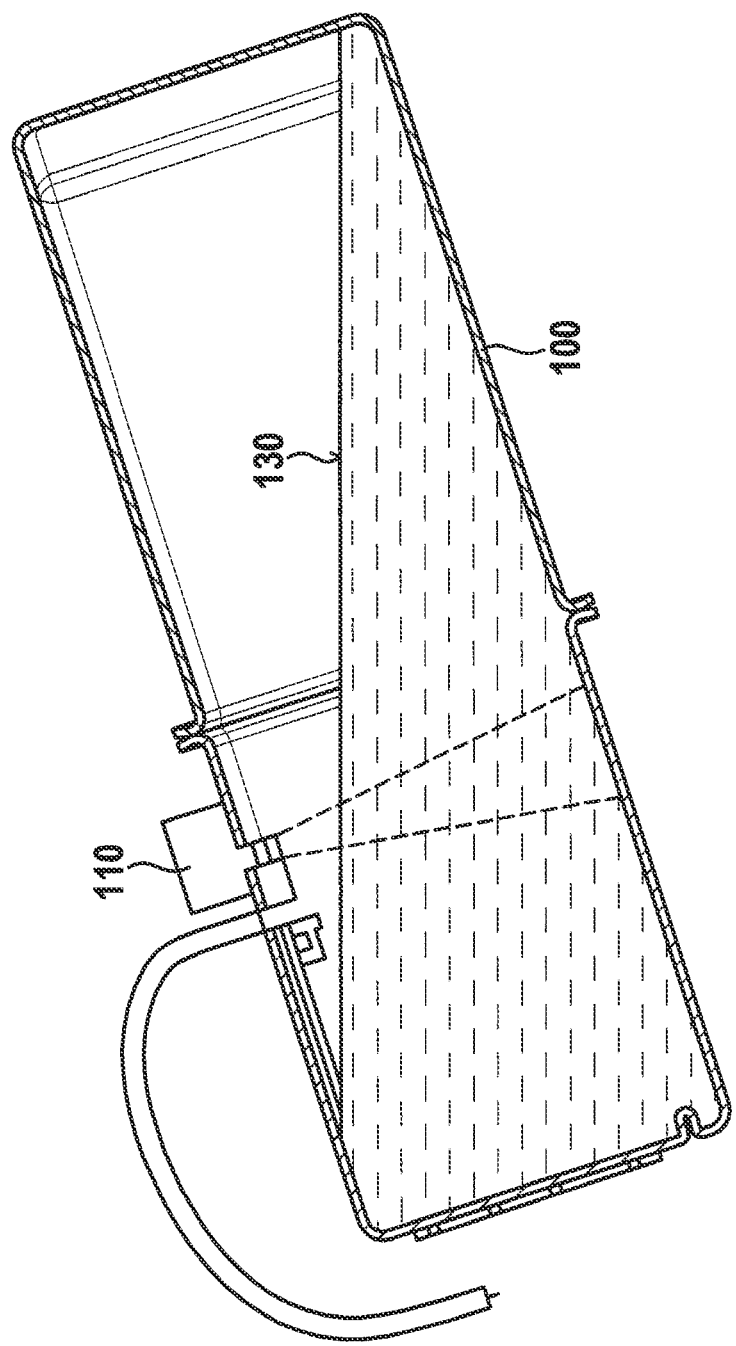
FIG. 1 shows a representation of a fluid tank including a filling level sensor, in an inclined position.

FIG. 1 shows a representation of a fluid tank 100 including a filling level sensor 110, in an inclined position. Fluid tank 100 is presently a UWS tank in a motor vehicle. A filling level sensor 110 situated at the top of fluid tank 100 is depicted, which determines the distance from fluid surface 130. Due to an inclination of the vehicle and thus also of tank 100 situated in the vehicle, the measured distance from fluid surface 130 is smaller than in a horizontal orientation of the vehicle on a flat surface. Without corrective measures, a tank volume is indicated which is too large. Using suitable position information about the vehicle and with knowledge of the geometry of tank 100, a correction of the measured signal of filling level sensor 110 may be carried out.

To determine the tank content according to the multisensor principle, in addition to the piece of information from filling level sensor 110, the piece of information about the instantaneous consumption and data about the vehicle inclination or tilt ascertained with the aid of inclination sensors are also necessary.

With the aid of the information about the tilt and the inclination of the vehicle and with knowledge about the profile of the tank gauge as a function of these two variables, the tank content may be reverse-calculated.

The value thus ascertained about the tank volume is used when starting up the vehicle as an accurate starting value for the tank gauge; however, the position correction is also carried out during travel, in order to correct the influences of ascents or descents and various inclinations on the tank gauge here as well.

However, the signal of the corrected tank level sensor thus obtained is still subject to fluctuations which may be attributed to the dynamics of the tank content (for example, sloshing). These fluctuations may be compensated for to a certain extent by forming a sliding average value of the corrected tank level sensor signal over a longer period of time, but not completely eliminated.

Figure 2:
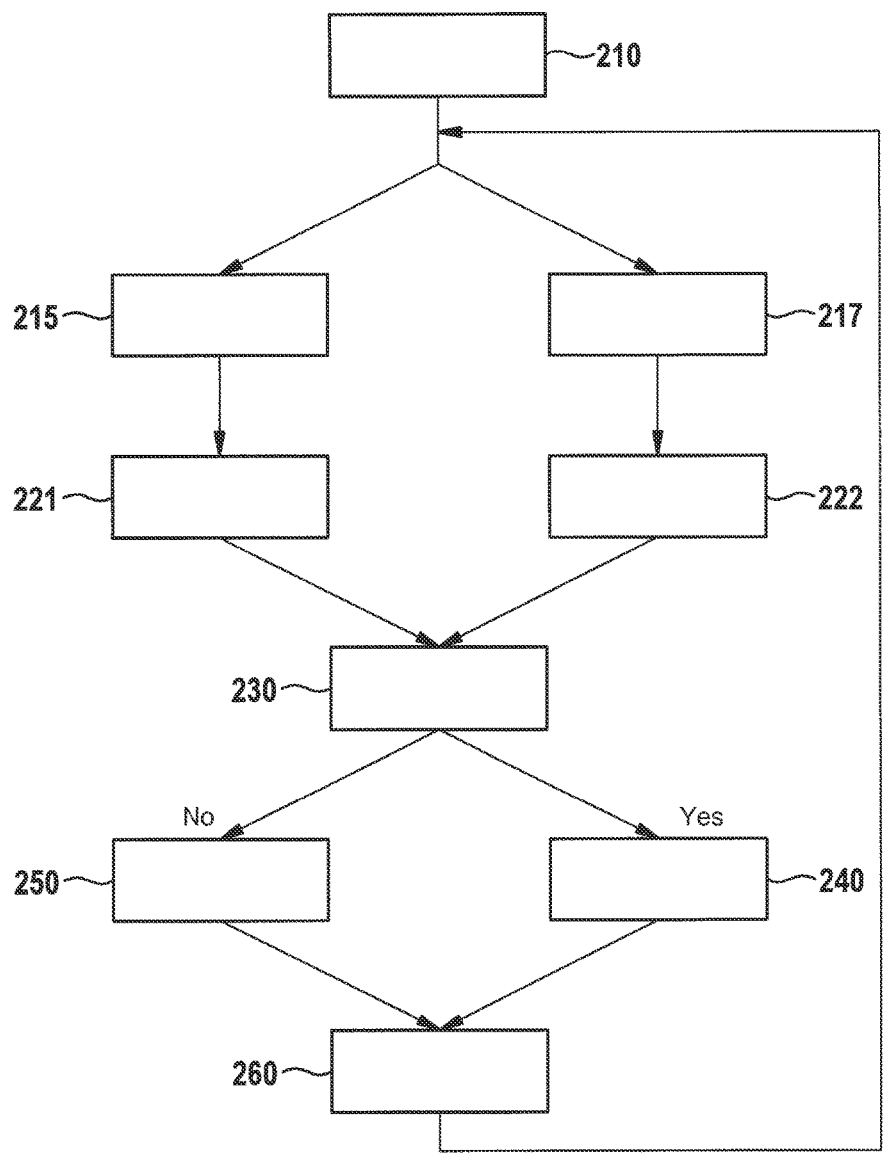
FIG. 2 shows a representation of the method sequence for determining the tank volume according to the multisensor concept.

FIG. 2 shows a flow chart for determining the tank volume according to the multisensor concept. As soon as the vehicle has started in step 210, the integration of the instantaneous consumption of the vehicle in step 215, and the correction of the signal of the filling level sensor in step 217 with the aid of vehicle position information, begin in parallel.

In step 217, the starting value of the tank gauge is derived from the corrected signal of the filling level sensor, at least during the first cycle of the method. The instantaneous consumption may already be factored into this calculation.

Subsequently, also in parallel, a window is formed around the result of the integration of the instantaneous consumption in step 221, and the sliding average value of the corrected filling level sensor signal is formed in step 222. The window indicates the range in which the tank content is expected.

In the following case differentiation in step 230, it is checked whether the averaged and corrected filling level sensor signal from step 222 lies within this window from step 221. If this is the case, subsequently, in step 240, the sliding average value of the corrected filling level sensor signal from step 222 is assumed to be true, and is used as a new initial value for the integration of the instantaneous consumption in step 215.

If the sliding average value of the corrected filling level sensor signal from step 222 is not within the limits of the window formed in step 221, the tank content calculated from the integration of the instantaneous consumption in step 215 is used in step 250. After indicating the tank content in step 260, a jump is made again to the start of the flow chart, and the procedure is repeated as long as the vehicle is in operation.

In one exemplary embodiment, the method according to the present invention for measuring the filling level in fluid containers uses available data of a route profile of the presently traveled on route for improving the accuracy of the filling level measurement.

With the aid of the route profile, it is possible to significantly improve the filling level modeling and to minimize malfunctions in the software.

For example, a position determination may be carried out with the aid of a GPS system available in the vehicle. It also includes elevation information which may be used according to the method. With the aid of multiple successive position determinations, each using associated elevation information, it may thus be detected that the vehicle, for example, is moving on a grade or an uphill grade over a longer period of time.

In addition, using a position determined, for example, via GPS, including available geographical map data from which, in addition to road contours, elevation contours may also be gathered, a longer-lasting ascent or a descent may also be inferred. Through a combination of both methods, the accuracy of the position determination and the reliability of the detection of ascents or descents may be further improved. For including geographical map data, for example, freely available maps such as Open Street Map (OSM) may also be used.

As a result of such an unambiguous association of an ascent or a descent and its approximate length, it is possible to improve the volume ascertainment with the aid of the above-described methods and to prevent the detection of an incorrect tank level.

Such an improvement may, for example, be achieved via a filtering of the signal of the filling level sensor, in that the signal is either not enabled for a calculation during an ascent or a descent, or only at certain times, for example, at times at which information about the inclination of the vehicle is available and the signal of the filling level sensor may therefore be correspondingly corrected. During brief ascents or descents, the signal may also simply be deactivated.

Another option is to deactivate the first method for calculating the fluid volume of the tank during an ascent or a descent. In this case, the calculation of the fluid volume is carried out only according to the second method with information about the quantity of the urea-water solution fed into the exhaust gas system, i.e., the instantaneous consumption of this solution.

Alternatively, a correction of the filling level measured with the aid of the filling level sensor may be carried out including, for example, a grade factor as a function of a grade in the route profile. With the aid of this grade factor, for example, a correction of the volume or filling level calculation may be improved using the correction-calculation algorithm.

The legislation also requires a check of the plausibility of the ascertained measuring values during the volume determination. In this context, a plausibility check means a check of the measuring value ascertained via a filling level sensor in terms of whether the measuring value is plausible and traceable.

In such a way, obvious inaccuracies during the measuring value collection may be detected. If, for example, the vehicle tilts in such a way that it may be expected that the distance between a filling level sensor situated on the upper side of the tank and the fluid surface becomes greater, the measuring value must also become greater. If a greater distance is measured in this case, the measuring value is plausible and may correspondingly be processed further. If an equal or smaller distance is measured in this case, the measuring value is not plausible. This measuring value is not processed further, since it is erroneous.

The plausibility check may, for example, be carried out with the aid of route data in such a way that two position points are selected on a route to be traveled having different grades.

It is expected that different measuring values will occur during the measurements via the filling level sensor, for example, a change in length in the sensor signal in a filling level method shown in FIG. 1, in the case of different grades or inclined positions of the vehicle. Thus, the length of the sensor signal changes by x mm as a function of the tank geometry if the tank is brought, for example, from the inclined position depicted in FIG. 1 which, for example, occurs during an ascent, into a horizontal position. If the results of the measurements via the filling level sensor correspond to these assumptions, the measuring result is plausible and may be used for determining the filling level of the fluid tank.

During these measurements, the sloshing behavior is also to be considered in order not to ascertain an incorrect error. This may be achieved by carrying out measurements only during standing phases or standing phases having an established minimum duration. Alternatively, measurements may be carried out only if the vehicle moves over an established minimum time at a constant acceleration and without a change in the grade.

What is claimed is:
1. A method for determining a filling level of a fluid tank in a motor vehicle, the method comprising:
  performing a first calculation of a fluid volume of the fluid tank with a first process, the first process including:
    detecting an ascent or a descent of the motor vehicle with multiple pieces of position data ascertained in succession via a position determination system,
    ascertaining a grade of an associated route section in each case for the ascertained position data,
    selecting at least two route sections having different grades, ascertaining a measuring value of a filling level sensor to be expected for each of them, and obtaining a measured measuring value for each of them from the filling level sensor situated in the fluid tank, and performing a plausibility check of the measured measuring values of the filling level sensor via a comparison of the measuring values to be expected with the measured measuring values of the filling level sensor, wherein the first calculation of the fluid volume is based on the plausibility check;

displaying on a display device an indication of the filling level to a driver of the motor vehicle based on the calculated fluid volume of the fluid tank; and preventing a restarting of the motor vehicle based on the calculated fluid volume of the fluid tank;

wherein the fluid tank is a urea-water solution tank.

2. The method of claim 1, wherein a second calculation of the fluid volume of the fluid tank is performed with a second process using data about an instantaneous consumption of the fluid of the fluid tank, a comparison of the calculated fluid volume of the first and second processes being performed and in the case of a match, the fluid volume calculated according to the first process, or otherwise the fluid volume calculated according to the second process, being output as the filling level of the fluid tank.

3. The method of claim 2, wherein, if the ascent or the descent of the motor vehicle is detected, the fluid volume of the fluid tank is determined only according to the second process from data about the instantaneous consumption.

4. The method as recited in claim 2, wherein in the case of a detection of the ascent or the descent of the motor vehicle, a signal of the filling level sensor is filtered.

5. The method of claim 1, wherein a detection of an ascent or a descent of the motor vehicle occurs via a comparison of multiple position data ascertained in succession.

6. The method of claim 1, wherein only those measured measuring values which match the expected measuring values or lie within an established tolerance range are processed in accordance with the first process.

7. The method of claim 1, wherein the detection of an ascent or a descent of the motor vehicle occurs so that a comparison of elevation information associated with the position data is performed over a predefined time interval, and in the case of a continuous increase of the elevation, an ascent is inferred, or in the case of a continuous decrease of the elevation, a descent is inferred.

8. The method of claim 1, wherein, in addition to the position data, geographical map data about a route which is presently being traveled on is used for detecting an ascent or a descent of the motor vehicle.

9. The method of claim 1, wherein a comparison of the measuring values to be expected with the measured measuring values is performed in that a first difference is ascertained between two of the measuring values to be expected, a second difference is ascertained between two of the measured measuring values, and the first and the second difference are compared to each other.

10. The method of claim 1, wherein, if the ascent or the descent of the motor vehicle is detected, a factor which is a function of the grade is ascertained, and a correction of the measuring signal of the filling level sensor is performed using this factor.

11. The method as recited in claim 1, wherein the displaying includes displaying a warning to the driver to replenish fluid in the fluid tank.

12. A non-transitory computer readable medium having a computer program, which is executable by a processor, comprising:

a program code arrangement having program code for determining a filling level of a fluid tank in a motor vehicle, by performing the following:

performing a first calculation of a fluid volume of the fluid tank with a first process, the first process including:

detecting an ascent or a descent of the motor vehicle with multiple pieces of position data ascertained in succession via a position determination system, ascertaining a grade of an associated route section in each case for the ascertained position data, selecting at least two route sections having different grades, ascertaining a measuring value of a filling level sensor to be expected for each of them, and obtaining a measured measuring value for each of them from the filling level sensor situated in the fluid tank, and performing a plausibility check of the measured measuring values of the filling level sensor via a comparison of the measuring values to be expected with the measured measuring values of the filling level sensor, wherein the first calculation of the fluid volume is based on the plausibility check;

displaying on a display device an indication of the filling level to a driver of the motor vehicle based on the calculated fluid volume of the fuel tank; and preventing a restarting of the motor vehicle based on the calculated fluid volume of the fluid tank;

wherein the fluid tank is a urea-water solution tank.

13. The non-transitory computer readable medium of claim 12, wherein a second calculation of the fluid volume of the fluid tank is performed with a second process using data about an instantaneous consumption of the fluid of the fluid tank, a comparison of the calculated fluid volume of the first and second processes being performed and in the case of a match, the fluid volume calculated according to the first process, or otherwise the fluid volume calculated according to the second process, being output as the filling level of the fluid tank.

14. The non-transitory computer readable medium as recited in claim 12, wherein the displaying includes displaying a warning to the driver to replenish fluid in the fluid tank.

15. An electronic control unit, comprising:

a processor configured to determine a filling level of a fluid tank in a motor vehicle, by performing the following:

performing a first calculation of a fluid volume of the fluid tank with a first process, the first process including:

detecting an ascent or a descent of the motor vehicle with multiple pieces of position data ascertained in succession via a position determination system, ascertaining a grade of an associated route section in each case for the ascertained position data, selecting at least two route sections having different grades, and ascertaining a measuring value of a filling level sensor to be expected for each of them, and obtaining a measured measuring value for each of them from the filling level sensor situated in the fluid tank, and performing a plausibility check of the measured measuring values of the filling level sensor via a comparison of the measuring values to be expected with the measured measuring values of the filling sensor, wherein the first calculation of the fluid volume is based on the plausibility check;

displaying on a display device an indication of the filling level to a driver of the motor vehicle based on the calculated fluid volume of the fluid tank; and preventing a restarting of the motor vehicle based on the calculated fluid volume of the fluid tank;
wherein the fluid tank is a urea-water solution tank.

16. The electronic control unit as recited in claim 15, wherein the displaying includes displaying a warning to the driver to replenish fluid in the fluid tank.

* * * * *